Patented Jan. 1, 1952

2,580,890

UNITED STATES PATENT OFFICE 2,580,890

PHENOL FORMALDEHYDE-RYE FLOUR-SODIUM HYDROSULFITE CONTAINING ADHESIVE COMPOSITION

Laurence E. Clark, Jr., Bainbridge, N. Y., assignor to The Borden Company, New York, N. Y., a corporation of New Jersey No Drawing. Application April 15, 1947, Serial No. 741,688

1 Claim. (Cl. 260—7)

This invention relates to synthetic resin compositions, and in particular to condensation-type resin adhesives which are combined with seed flour extenders.

Heretofore, it has been found desirable to employ gluten-containing seed flours as extenders for condensation-type resin adhesives. Such extenders are used primarily to reduce costs. An aqueous medium, such as water, is always a necessary ingredient when an extender of the class described is used in combination with the aforesaid condensation-type resin adhesive as, for example, when the adhesive is spread over a surface to be glued or assembled. When such gluten-containing seed flours are used as extenders the amount of water required for the mix depends primarily upon the quality of the particular seed flour used. Poorer grades of seed flours require more water than the better grades.

In such practice, however, serious problems have arisen because, when such extenders have been used in substantial amounts, the "free flow" of the resin composition is retarded and the liquid adhesive is thus found to be spreadable only with difficulty. Such compositions become stringy and have a porridge-like consistency on being dissolved or dispersed in water. In addition, such resin adhesives, when highly extended with a gluten-containing seed flour, inevitably require the addition of large quantities of water to enable them to become spreadable. This raises further problems, however, in that when such large amounts of water are used various difficulties arise in the subsequent processing operations as, for example, when these adhesives are employed in wood laminating in hot-pressing operations. The large amount of water employed is converted into steam during the hot-pressing operations which in turn causes the formation of blisters between the laminae, thus making the finished article unfit for commercial use.

It was, therefore, a general object of this invention to overcome the disadvantages heretofore encountered, and to improve the spreading properties and characteristics of condensation-type resin adhesive compositions employing seed flour extenders.

Another object of this invention was to reduce the amount of water required to produce an adhesive composition of a resin and seed flour combination.

Still another object of this invention was to produce an adhesive composition which would have improved strength, would not readily blister and which would have other desirable properties when used in hot-pressing operations.

Further objects of the invention will be apparent from the following specification and claim.

Accordingly, I have now overcome the foregoing difficulties and have achieved the aforesaid objects by combining the synthetic resin adhesive of the class described with a chemically-modified gluten-containing seed flour extender. The seed flour extender is modified by chemical treatment of the gluten contained in the flour, and such extender, when combined with the aforesaid resins, yields a free-flowing and easily spreadable mix when the adhesive composition is diluted with an aqueous media, such as water.

Aqueous mixes of such adhesive compositions may be made with amounts of water small enough to substantially eliminate blister formation in hot-pressing operations, and at the same time still have sufficient water present to give a satisfactory wet mix adhesive having good spreading characteristics; and moreover, when the modified seed flour is employed, the amount of water which is necessary to give a satisfactory mix is less than that amount required when an unmodified seed flour is employed. For example, when a chemically-modified seed flour was employed as an extender in combination with a condensation-type adhesive of the class described, the amount of water necessary to provide a satisfactory adhesive composition was reduced by approximately 10 per cent.

Gluten-containing seed flours in general are suitable for use in the practice of this invention. Examples of such seed flours comprise those derived from wheat, rye, sorghum, and the like. Rye flour ordinarily requires more water than wheat flour but the rye flour may be chemically modified or "thinned" by treatment in the same manner as wheat or any other gluten-containing flour.

Gluten is a water-insoluble protein. It is believed that the gluten forms a colloidal suspension in an adhesive composition mix, upon the addition of water or other aqueous media, and it is chiefly because of this physical characteristic that such resin adhesive compositions containing a substantial amount of gluten-containing seed flour exhibit a thickening effect when water is present. If the gluten is removed or modified, however, the starch contained in the seed flour disperses in aqueous media to a certain extent without unduly thickening and without producing mixes having undesirable stringiness which impairs its spreading properties.

Sulfur dioxide gas ($SO_2$), an aqueous solution of the gas, e. g., $H_2SO_3$, and a substance which may be decomposed to release $SO_2$ or $H_2SO_3$ are those chemicals which may be employed in the present invention to modify the gluten in the seed flour. For purposes of definition, the term "$SO_2$-producing substance" as used herein, therefore, is intended to include such chemicals.

Broadly, the gluten-containing seed flour may be modified by treatment with an $SO_2$-producing substance; in particular, sulfurous acid, $H_2SO_3$. The $H_2SO_3$ used for such purposes may be acquired in various ways. For example: sulfur dioxide gas may be passed into an aqueous media to form $H_2SO_3$, and the flour mixed therewith, or the flour may be premixed with the aqueous media prior to introducing the $SO_2$ gas, or the $SO_2$ gas may be passed into an aqueous flour-resin adhesive mixture. The $H_2SO_3$ chemically reacts with the gluten of the flour, and the flour is thus modified for the purpose of making it satisfactory for use as an extender. Instead of using sulfur dioxide gas or sulfurous acid, there may be employed a substance which upon being dissolved in aqueous media and/or heated decomposes to release $SO_2$ gas or $H_2SO_3$.

An $SO_2$-producing substance, e.g., sulfur dioxide, sulfurous acid or a substance decomposable to $SO_2$ or $H_2SO_3$ may be added to a resin-adhesive flour mixture. In the case of a substance decomposable to $SO_2$, such substance may be added to the flour, the resin adhesive or to the adhesive-flour mixture and the $SO_2$ then gradually released through the addition of water, with or without heat.

Alternatively, a "master-mix" may be made of the flour extender, water and a substance which decomposes to $SO_2$ or $H_2SO_3$, preferably upon slight heating, such as sodium metabisulfite. After modification of the gluten in the flour has taken place, a dry-resin adhesive in powder form may be added thereto, or a portion of the modified gluten flour extender from the "master-mix" may be added to a dry-resin adhesive in powder form together with water sufficient to dissolve the resin powder. Alternatively, the modified gluten-flour extender from the "master-mix" may be added to a liquid resin in place of a resin powder.

As a further alternative, there may be employed a flour which has been premodified by an $SO_2$ treatment as, for example, in accordance with the teachings of U. S. 1,969,347 to Bauer, and such flour then used as an extender for the resins of the class described. The $SO_2$ reacts chemically with the flour and has a degelling action on the gluten in the flour, preventing the formation of dough or gel in the presence of moisture or when the flour is moistened with water.

In the now preferred embodiment, the $SO_2$ may be released in situ by adding an acid-producing salt together with a salt, which decomposes to release $SO_2$, to a mixture of the resin and extender and thereafter the $SO_2$ is released by hydrolysis when water is added to the mixture. For example, the $SO_2$ is released in situ by including an $SO_2$-decomposable substance with most ordinary catalysts employed with the acid-curing resin adhesives, such as urea-formaldehyde, especially where there is some free formaldehyde present. A typical catalyst for acid-curing resins of the class described is ammonium chloride, an acid-producing salt. It is thought that the ammonium chloride reacts with the free formaldehyde present in the resin to release hydrochloric acid and hexamethylenetetramine, or an intermediate thereof. The hydrochloric acid in turn reacts with the $SO_2$-decomposable substance of the class described to release sulfur dioxide, and the sulfur dioxide then reacts with the gluten contained in the flour, producing a modified flour, thus enhancing its utility as an extender. This theory is given merely by way of an explanation and not by way of limitation.

Salts which produce sulfur dioxide by decomposition are satisfactory for use in an adhesive mix. A good example of such a salt is sodium bisulfite, which decomposes in aqueous solution to produce sulfur dioxide, which in turn produces the desired thinning effect upon the gluten-containing flour. Addition compounds of sulfurous acid and salts of sulfurous acid in general are satisfactory because they liberate sulfurous acid by hydrolysis. Addition compounds of anhydrides of sulfurous acid and their salts, examples of which are sodium meta-bisulfites and sodium pyrosulfites, also produce a good thinning effect upon the flour in an adhesive mix. $SO_2$-decomposing substances such as derivatives of sulfurous acid and salts thereof, for example, sodium hydrosulfite, sodium thiosulfate, and the like, do not ordinarily break down to release $SO_2$ in neutral solution. As a rule there must be some acid present to decompose these substances to release the $SO_2$ by hydrolysis. Organic addition compounds of sodium hydrosulfite with aldehydes and ketones, such as sodium formaldehyde sulfoxylate, readily yield $SO_2$ in the adhesive mix and hence may be used to modify the gluten and thus produce a satisfactory thinning effect.

The practice of this invention is particularly applicable to resin-seed flour mixes wherein the amount of seed flour extender used is greater than the amount of resin in the extended adhesive composition, even when the amount of extender is as much as 400 parts to 100 parts of 62% solids of liquid resin. In general, however, improved spreadability of adhesive compositions containing seed flours is accomplished by the addition of a thinning agent regardless of the extent to which the resin is extended, but it is not usually the practice to add a modifying agent to an extended resin composition unless the amount of extender is at least equal to the amount of resin used.

In general, these extenders are used with the condensation-type resins to form the adhesive compositions such, for example, as urea-aldehyde resins, aniline-aldehyde resins, phenol-aldehyde resins, resorcinol-aldehyde resins, melamine-aldehyde resins, and the like.

Phenol-type bodies which may be used to prepare condensation-type resins comprise phenol, the ortho, meta, and para cresols, cresylic acid, xylenol, resorcinol, catechol, quinol (hydroquinone), pyrogallol (pyrogallic acid), phloroglucinol, or combinations thereof, and the like. Amines, amides and triazines which may be used to prepare the aminoplast resins of the class described comprise urea, thiourea, guanidine, methyl urea, acetyl urea, cyanamide, dicyanodiamide, biuret, semi-carbazide, melamine, monophenylmelamine, diphenylmelamine, triphenylmelamine, ammeline, thioammeline, ammelide, formoguanamine, acetoguanamine, lauroguanamine, stearoguanamine, and the like.

These aforesaid bodies or combinations thereof may be reacted with the various aldehydes, as a class, to produce the condensation-type resin of this invention, such, for example, with formaldehyde, acetaldehyde, propionaldehyde, crotonaldehyde, benzaldehyde, furfuraldehyde, and the like.

In general, the acid-curing type resins, such as the urea-formaldehyde resin adhesives, are catalyzed by acid or acid-producing salts such, for example, as ammonium chloride, ammonium sulfate, ammonium biborate, sodium bisulfate, and the like. Such catalysts cause the urea-formaldehyde reaction to proceed to an insoluble state by bringing about the curing of the resin. When urea-formaldehyde type resins are simultaneously catalyzed and extended with a gluten-containing seed flour, sodium thiosulfate is preferably employed as the thinning agent because sulfur dioxide is formed by the interaction of the sodium thiosulfate and the acid produced by the interaction of the urea-formaldehyde resin and catalyst. Experimentally, it has been found that quantities as little as 1 part of sodium thiosulfate will produce a pronounced thinning and smoothing effect on 100 parts of a urea-formaldehyde resin extended with as much as 400 parts of a gluten-containing seed flour mix.

Catalyst compositions, such as catalyst "A," and catalyst "B" shown below, are satisfactory for use with a urea-formaldehyde resin liquid containing approximately 62 per cent solids. Preferably, 10 parts of the catalyst composition are used for each 100 parts of liquid resin. The catalyst "A" composition is preferably used when the adhesive is used in "cold-pressing"; i. e., room - temperature, operations. The catalyst "B" composition is preferably used when the adhesive is employed in hot-pressing operations. When the gluten-containing seed flour extender is used in amounts over 200 parts per 100 parts of liquid urea-formaldehyde resin, it is preferred to use about 2 parts of sodium meta-bisulfite in conjunction with 10 parts of catalysts "A" or "B." Satisfactory mixes for the "A" and "B" catalysts are as follows:

*Catalyst "A"*

| | Parts by weight |
|---|---|
| Ammonium chloride | 72.07 |
| Urea | 18.02 |
| Zinc stearate | 0.90 |
| Sodium thiosulfate | 9.01 |
| | 100.00 |

*Catalyst "B"*

| | Parts by weight |
|---|---|
| Ammonium chloride | 27.27 |
| Ammonium biborate | 27.27 |
| Urea | 36.37 |
| Sodium thiosulfate | 9.09 |
| | 100.00 |

Paraformaldehyde, hexamethylenetetramine, sodium hydroxide, hydrochloric acid, oxalic acid, hypophosphorous acid, paratoluene-sulfonic acid, and the like and combinations thereof may be used as catalysts for the resorcinaldehyde resins and also for some phenol-aldehyde resins. Melamine-aldehyde resins ordinarly do not require the use of a catalyst to cure them.

Condensation-type resins which are capable of being brought to an infusible and insoluble state by methods other than catalysis with an acid-producing catalyst may be extended with gluten-containing seed flours, and in this embodiment it is preferred that the spreading characteristics of the adhesive composition be improved by the addition of a thinning (i. e., gluten-modifying) agent. Such gluten-modifying agents comprise sulfur dioxide, sulfurous acid, sodium bisulfite, and other modifying agents of the class described which readily produces sulfur-dioxide, especially those which produce sulfur dioxide by hydrolysis. A preferred method of mixing the adhesive composition in this embodiment is to combine the modifying agent with the gluten-containing seed flour and water and then allow the flour-water mix to thin before adding the resin.

Melamine resins, which ordinarily do not require catalysts to promote condensation to the solid state, may be mixed with gluten-containing flour extender, a modifying agent which produces sulfur dioxide in the presence of acid or upon hydrolysis, water, and a small amount of acid, the acid being used in such instance solely for releasing the $SO_2$. Of course, sulfur dioxide gas may be passed into water and the acidulated water used to modify the extender before mixing with the melamine resin.

In general, sulfur dioxide gas within the range of from 0.01 to 5.0 parts $SO_2$ per 100 parts of seed flour gives a satisfactory adhesive composition having good spreading properties. Compounds which readily yield sulfur dioxide by hydrolysis or decomposition may be used within the range of from 0.5 to 10 parts per 100 parts of gluten-containing seed flour used in the resin-seed flour mix. When sodium thiosulfate is used with a urea-formaldehyde type resin, the actual amount of sulfur dioxide formed from it depends on and is directly proportional to the amount of acid which is available to decompose the sodium thiosulfate.

The usable life of a hot-press resin formulation is generally desired to be 24 hours or longer, and this long life is obtained in some cases by buffering the catalyst composition where an acid-producing catalyst is used. The usable life of a highly extended adhesive composition is increased by the use of a modifying agent because the mix containing a modifying agent has a smooth fluid nature up to the time of solidification, although the liquid life may actually not be prolonged. When such an agent is not used, the adhesive mix becomes thick and mush-like in a short time and is low in spreadability due to its high viscosity.

The gluten-containing seed flour extender may be treated separately with a modifying agent and then added to a condensation-type resin, or the modifying agent may be mixed with the resin-extender combination. The seed flour may be modified in the presence of water, dried, and used as an extender when desired. When a resin having a high pH, within the range of from 7.5–10.0, is used, the action of the modifier on the flour gluten is repressed by the base present and it is therefore necessary to add the modifier to the flour-water mix and wait until the desired thinning has taken place before adding the resin to make the finished adhesive mix. Other methods of modifying the gluten will readily suggest themselves.

The following examples are given for purposes of illustrating the invention and not by way of limitation. Unless otherwise stated, all parts given are by weight.

*Example I*

One mol of phenol was reacted with two mols of 37% formaldehyde to which sufficient caustic soda was added to obtain a pH of 9.5 of the mixture. After condensation had been completed, the water was removed by atomizing the resin in a blast of hot air in a drying chamber to produce a fine phenol-formaldehyde resin powder. A separate mix of the extender was then made by adding the modified rye flour mixture obtained by mixing 100 parts of rye flour with 110 parts of water and 2 parts of sodium hydrosulfite. The extender was then mixed with 100 parts of the resin powder and 80 parts of water. The mixture thus prepared was used as an adhesive composition for bonding wood veneers at a temperature of 280–300° F.

*Example II*

One mol of urea was reacted with two mols of formaldehyde at a pH of 6.3. After condensing the pH was raised to 7.1 by the addition of trisodium phosphate, and the condensation product concentrated by removing a part of the water under vacuum until a solids content of 62% was obtained. One hundred parts of the liquid resin was mixed with 100 parts of wheat flour, 100 parts of water, 7.2 parts of ammonium chloride, 1.8 parts of urea, and 0.9 part of sodium thiosulfate. The last three ingredients listed may be combined with 0.09 part of zinc stearate to prevent caking from moisture in the air and used as a one-part catalyst. Ten parts of this catalyst were used. The mixture thus prepared was then used as an adhesive composition for bonding wood at a temperature of 70° F.

*Example III*

Three mols of formaldehyde were reacted with one mol of melamine at a pH of 6.1. The condensation product was concentrated under vacuum to a solids of 60%. One hundred parts of the resin were mixed with 150 parts of wheat flour, 125 parts of water and 1 part of sodium bisulfite. The mixture thus prepared was then used as an adhesive for bonding wood veneers in a hot platen press at a temperature of 280° F.

Plywood made by the use of hot and cold press resin formulations extended with a seed flour and which contain a sulfur dioxide-producing agent has a strength as measured by a plywood shear test at least equal to or greater than that obtained from an extended adhesive composition which does not contain a sulfur dioxide-producing salt.

Since certain changes may be made in the above composition of matter and different embodiments of the invention could be made without departing from its scope, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

What is claimed is:

An adhesive composition of matter consisting of 100 parts of resin powder obtained by condensing 1 mol of phenol with 2 mols of 37 per cent formaldehyde solution in the presence of sufficient caustic soda to give a pH of approximately 9.5 and thereafter removing the water and pulverizing to produce the dry resin powder; together with 80 parts of water and 100 parts of an extender composed of 100 parts of rye flour, 110 parts of water, and 2 parts of sodium hydrosulfite.

LAURENCE E. CLARK, JR.

REFERENCES CITED

The following references are of record in the file of this patent:

UNITED STATES PATENTS

| Number | Name | Date |
|---|---|---|
| 1,969,347 | Bauer | Aug. 7, 1934 |
| 2,019,834 | Vierling | Nov. 5, 1935 |
| 2,141,313 | Osgood | Dec. 27, 1938 |
| 2,264,732 | Weber | Dec. 2, 1941 |
| 2,302,309 | Glarum et al. | Nov. 17, 1942 |
| 2,332,801 | Leonardson et al. | Oct. 26, 1943 |
| 2,333,526 | Denyes | Nov. 2, 1943 |
| 2,407,599 | Auten | Sept. 10, 1946 |
| 2,492,510 | Van Epps | Dec. 27, 1949 |